United States Patent Office 2,847,273
Patented Aug. 12, 1958

2,847,273

MANGANESE DIOXIDE METHOD FOR PREPARATION OF PROTOACTINIUM

Leonard I. Katzin, Chicago, Ill., assignor to the United States of America as represented by the United States Atomic Energy Commission No Drawing. Application January 19, 1948
Serial No. 3,168

17 Claims. (Cl. 23—14.5)

This invention is concerned with the production of the synthetic isotope of uranium, $U^{233}$, and more particularly with the concentration and purification of $Pa^{233}$ as a step in the production of $U^{233}$.

In this specification and the claims the name of the element is used to designate the element generically either in the elemental state or combined in a compound, unless otherwise indicated by the sense by which it is used, or by a specific designation such as "metal" or elemental."

Natural uranium consists of three isotopes, namely, $U^{238}$, $U^{235}$, and $U^{234}$. A uranium isotope, $U^{233}$, has been produced by neutron-irradiation of other elements and their radioactive decay to form $U^{233}$. The most successful method of producing $U^{233}$ is the one employing the irradiation of natural thorium ($Th^{232}$) with slow neutrons in a pile reactor where $Th^{233}$ is formed. $Th^{233}$ decays by beta-emission with a short half-life to $Pa^{233}$ which in turn decays with beta-emission to $U^{233}$. The usual reaction path is shown by the following equations:

$$_{90}Th^{232} + _0n^1 = _{90}Th^{233} + \gamma$$

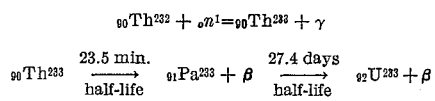

The neutron capture cross-section of $Th^{232}$ is large for neutrons having energies less than approximately one million electron volts (m. e. v.) so that if $Th^{232}$ is placed in a pile reactor together with a source of neutrons, such as $U^{233}$, $U^{235}$, or $Pu^{239}$, a portion of the neutrons emitted will be captured by the thorium atoms to form $Th^{233}$. The reaction is permitted to continue for periods ranging from several weeks to several months, since a certain portion of the neutrons produced by fission cause other reactions in the material in the pile, which tend to make longer irradiation periods unfeasible. For example, the $Pa^{233}$ formed in the pile as a result of the decay of the $Th^{233}$ formed in the primary reaction, absorbs neutrons to form $Pa^{234}$. The $Pa^{234}$ decays to form $U^{234}$, which is not readily fissionable. Thus the chief reason for limiting the reaction is to reduce parasitic neutron absorption by $Pa^{233}$, as its concentration builds up. It is also undesirable to permit too large a concentration of the highly radioactive fission products to build up. Because of this short reaction period, the thorium mass, when removed from the pile, has a very minute portion of the $Th^{233}$ present, usually of the order of several parts per million. The thorium mass is also contaminated with a small percentage by weight of fission products but these are highly radioactive. These fission products are elements having atomic numbers between about 32 and 64. The isotopes of these elements as originally produced are considerably overmassed and undercharged and hence are highly unstable. By beta-radiation they quickly transform themselves into isotopes of these various elements having longer half-lives. The half-lives of these products range from a fraction of a second to thousands of years.

The method of separating the $Th^{233}$ (or its decay products) is highly important because of the very small portion of $Th^{233}$ present and because of the radioactivity of the mass. The $Th^{233}$, because of its short half-life, has usually substantially decayed to $Pa^{233}$ when the thorium mass is removed from the neutronic reactor. It has been found advisable to separate the $Pa^{233}$ from the mass as soon as possible after the thorium mass is removed from the reactor, because all thorium ores are usually contaminated with a small amount of uranium isotopes, and if the $Pa^{233}$ were permitted to decay to $U^{233}$ before being separated from the thorium mass, it would be very difficult to separate the $U^{233}$ from the other natural uranium isotopes contained in the thorium mass.

The most successful method of separation has been the precipitation method, which is based upon the selective carrying of protoactinium by certain carrier precipitates which do not carry the thorium, uranium, and other contaminants normally found in the neutron-irradiated throuim mass. One of the separation methods often employed is the manganese dioxide-zirconium phosphate separation process. In this process, the neutron-irradiated thorium composition is dissolved in a nitric acid solution and a manganese dioxide precipitate formed in the solution and separated therefrom. This manganese dioxide precipitate carries the protoactinium from the solution but leaves the thorium, uranium, and the majority of the fission products in the solution. The manganese dioxide carrier precipitate is then introduced into a hydrochloric acid solution containing hydrogen peroxide whereby the manganese dioxide carrier precipitate is dissolved. The excess of hydrogen peroxide is then boiled away from the solution. A zirconium phosphate precipitate is then formed in the solution and this carries the protoactinium from the solution. The protoactinium is separated from the zirconium phosphate carrier by electrolysis of the zirconium phosphate carrier in a solution containing an alkali fluoride. While this process is effective in separating the protoactinium from the usual contaminants, it is cumbersome and has certain other defects; for example, the boiling of the solution to remove the excess hydrogen peroxide results in a radioactive spray, which is very hazardous to personnel. The hydrochloric acid used in the dissolving step is corrosive to separation equipment, and the electrolysis step is slow and expensive.

An object of this invention is to provide a method of obtaining $U^{233}$ in a relatively pure form.

An additional object of this invention is to provide a simplified method of separating protoactinium from contaminants normally associated therewith in neutron-irradiated thorium.

A still further object of the present invention is to provide a method of separating natural protoactinium from the elements thorium and uranium with which protoactinium is always contaminated in nature.

Other objects will be apparent from the description of this invention which follows.

Broadly, the process of this invention comprises treating an aqueous acidic solution of neutron-irradiated thorium with a water-soluble manganous salt, and a water-soluble manganate or permanganate salt, whereby a carrier precipitate of manganese dioxide is formed. This precipitate carries protoactinium quantitatively, but does not carry thorium, uranium and most of the fission products. By separating the manganese dioxide precipitate from the solution the protoactinium is thus effectively separated from the thorium, uranium and bulk of the fission products. The manganese dioxide carrier precipitate is then dissolved by treating it with an aqueous acidic solution containing a suitable reducing agent having a potential more positive than about −0.80 volt, such as hydrogen peroxide or preferably hydroxylamine. The reducing agent reduces the tetravalent manganese to the divalent state, thus converting the insoluble manganese dioxide to a soluble manganese compound. The steps of forming a manganese dioxide carrier precipitate for protoactinium in an aqueous acidic solution, separating said carrier precipitate from the solution, and dissolving said carrier by treating with an aqueous acidic solution and a reducing agent, form a cycle which may be repeated as often as desired to effect the decontamination of the protoactinium, and its concentration with respect to the manganese dioxide carrier. Following the separation and concentration phase, the protoactinium is permitted to age for a suitable period, whereby it is substantially converted to $U^{233}$. The aging process may be carried out, either with the protoactinium associated with the dry manganese dioxide precipitate, or contained in the manganous solution. Following the aging process the manganese dioxide carrier containing the $U^{233}$, is brought into solution, if this has not already been done, and the manganese is then precipitated as manganese dioxide as set forth above. The manganese dioxide carries with it any protoactinium which has not decayed to uranium and any fission products which have been previously carried with the manganese dioxide, thus leaving the $U^{233}$ in a substantially pure state in the supernatant solution. The $U^{233}$ may be separated from the solution by any convenient method.

It is, of course, obvious that the foregoing method may be employed to separate protoactinium from thorium and uranium in the processing of the ores of these elements.

In the preferred embodiment the process of the present invention consists essentially of first dissolving the neutron-irradiated thorium compound in an aqueous acidic solution. Hydrochloric acid or nitric acid may be used but nitric acid is preferable since it is less corrosive to process containers. Following the dissolution of the thorium mass, the acidity of the nitric acid solution is adjusted so that it is between approximately 1 and 5 N. If greater than 5 N acid solution is used, there is a tendency for the excess nitric acid to react with the products obtained in the precipitation step which follows. If too low a nitric acid concentration is used there is an increased tendency for the thorium contained in the solution to carry with the manganese dioxide carrier precipitate subsequently formed in the solution. The thorium concentration in the solution is adjusted so that the thorium is present at a range between about 0.02–0.65 M. This range is for the most efficient operation although separate precipitations may be carried out outside this range with somewhat lessened efficiency. A manganese dioxide precipitate is then formed in the solution by introducing a soluble manganous salt and a soluble manganate or permanganate compound. The manganate or permanganate ion oxidizes the manganous ion to form the insoluble manganese dioxide. Since the end product of both the manganate or permanganate ions and the manganous ion is manganese dioxide, this effectively removes all of the $Mn^{+4}$ ion formed from the solution. Manganese dioxide carries protoactinium quantitatively, thus removing it from the solution, but uranium and most fission products are not carried by manganese dioxide so that they remain in solution. If the thorium is present in the solution in very small quantities, for example less than 0.02 M, or in quite large quantities, for example greater than 1 M, it may be carried with the manganese dioxide but in the preferred range, 0.02–0.65 M thorium concentration, only a very small percentage of the thorium is carried with the manganese dioxide. The only fission product carried in any quantity with manganese dioxide is zirconium and this is removed in the last stage of this process. The manganous ion is usually introduced into the solution as the manganous nitrate tetrahydrate, in quantities sufficient to give a manganese dioxide precipitate of approximately 1–1.5 grams of manganese dioxide per liter when oxidized with manganate or permanganate. This quantity is not critical, however, and satisfactory separations have been made where the concentration of manganese dioxide has ranged from 0.070–5.5 grams of manganese dioxide per liter of solution. The manganate or permanganate compound most commonly used in potassium permanganate and this is added in quantities sufficient to give the manganese dioxide precipitate set forth above. The permanganate is preferably added in two or more portions. The digestion of the permanganate and manganous ion depends upon the method used to separate the manganese dioxide precipitate from the solution. If the precipitate is separated by filtration or decantation, it is preferable to digest the precipitate at elevated temperatures for one-half hour or more as this forms a more crystalline precipitate. If the precipitate is to be separated by centrifugation, however, it is not necessary to use elevated temperatures or such a long digestion period. Following the separation, the protoactinium carrier precipitate of manganese dioxide is dissolved by introducing the precipitate into an aqueous acidic solution containing a reducing agent having a potential more positive than −0.80.

Suitable reducing agents include hydrogen peroxide and hydroxylamine, but the hydroxylamine has been found to have certain advantages over the hydrogen peroxide and other reducing agents. For example, the hydrogen peroxide has a tendency to form a precipitate with any thorium which may have carried the manganese dioxide. The excess hydrogen peroxide is also removed from the solution before re-precipitating the manganese dioxide and this is accomplished by boiling the solution, a step which causes the evolution of radioactive fumes. On the other hand, neither the hydroxylamine nor its oxidation products form precipitates with the ions present in the solution, and the excess hydroxylamine present after the reduction of the manganese dioxide is oxidized by the manganate or permanganate added in the following step of the process, wherein the manganese dioxide is re-precipitated. In addition the hydroxylamine will react at room temperature to bring the manganese dioxide into solution, and since it may be used in a nitric acid solution, it avoids the corrosion entailed in the use of a reducing agent which requires hydrochloric acid as a medium. The formation of a manganese dioxide carrier precipitate in an aqueous acidic solution, its separation from the solution together with the entrained protoactinium, and its dissolution in an aqueous acidic solution form a separation cycle which may be repeated as often as necessary or desirable to free the protoactinium from substantially all of the thorium, uranium, and radioactive fission products contained in the original neutron-irradiated thorium mass. This cyclic process may also be used to effectively concentrate the protoactinium. This is done by reducing the amount of manganese dioxide carrier in each cycle of the separation. It is believed that the protoactinium is carried on the precipitate by an absorption process so that, although the amount of manganese dioxide carrier is decreased on each cycle, the protoactinium is still carried quantitatively on each decreased precipitate. The decrease in amount of the carrier may be effected by introducing a less than stoichiometric amount of manganate or permanganate ion into the solution containing the manganous ion. Sufficient manganate or permanganate ion should be introduced to oxidize any excess hydroxylamine present as well as to form a precipitate of manganese dioxide by reaction with the manganous ion present. Following the last seapration cycle the solution containing the manganous ion and protoactinium or the manganese dioxide precipitate may be aged until the $Pa^{233}$ is substantially converted to the $U^{233}$. The $U^{233}$ is not carried by a manganese dioxide precipitate so that the manganous ions may then be separated from the $U^{233}$ by forming a manganese dioxide precipitate in the solution containing the manganese and $U^{233}$ and separating the precipitate therefrom. This precipitate not only removes manganese ions from the uranium, but also removes any $Pa^{233}$ which has not decayed and any other contaminants such as zirconium, which were originally carried through the separation cycles by the manganese carrier, thus leaving the $U^{233}$ in solution in a substantially pure state.

The process of the present invention may be illustrated by the following specific example.

*Example*

Solutions were made up containing the following concentrations: $KMnO_4$, 5.45 g./liter; $MnCl_2 \cdot 4H_2O$, 20.5 g./liter. Twenty λ (microliters) of the $KMnO_4$ solution was mixed with 20 λ of the $MnCl_2$ solution. To this solution was then added 20 λ of 6 N $HNO_3$, 20 λ $H_2O$ and 20 λ of a solution containing approximately 2 mg. of thorium and a tracer amount (3600 counts per minute) of protoactinium. The precipitate of manganese dioxide thus formed was digested at room temperature for thirty minutes and then separated by centrifugation. This supernatant solution was preserved for subsequent analysis by radiometric means. The precipitate was then introduced into a solution containing 20 λ of 6 N $HNO_3$ and 7 λ of $H_2NOH$. The precipitate was permitted to dissolve and then the solution was diluted with 60 λ of $H_2O$ and a manganese dioxide precipitate was formed in the solution by adding 25 λ of the $KMnO_4$ in two portions. This precipitate was separated from the solution to complete the cycle and the cycle was repeated four times in all. Radiometric analysis was then made of the precipitate and of the supernatant solutions and it was found that the protoactinium had carried better than 90%. The final precipitate was aged for sixty days and then dissolved in a nitric acid hydroxylamine solution as described above and a manganese dioxide precipitate separated therefrom, leaving the $U^{233}$ in solution in purified form.

It will be apparent to those skilled in the art that various modifications of the present invention exist. In general, it may be said that any process for the separation of protoactinium from thorium, uranium, and fission products normally associated with protoactinium in neutron-irradiated thorium in which the separation and concentration of the protoactinium depends upon a cyclic process of manganese dioxide carrier precipitation and dissolution is within the scope of the present invention.

What is claimed is:

1. The method of obtaining $U^{233}$ in a relatively pure state, which comprises carrying out a separation cycle on $Pa^{233}$ contained in an aqueous solution of neutron-irradiated thorium, said cycle comprising treating said solution with a water-soluble manganous compound and a water-soluble compound having an anion containing manganese in a valence state not less than +6 and oxygen, separating the carrier precipitate of manganese dioxide thus formed together with its associated $Pa^{233}$ from the solution and dissolved contaminants, dissolving the carrier precipitate in an aqueous acidic solution containing a reducing agent sufficiently electronegative to reduce the tetravalent manganese to the divalent state, and following said separation cycle aging the protoactinium until it has been substantially converted to $U^{233}$ by radioactive decay, then forming a manganese dioxide precipitate by treating the $Mn^{+2}$ ions present in solution with a water-soluble compound having an anion containing manganese in a valence state not less than +6 and oxygen, and separating the manganese dioxide precipitate thus formed from the $U^{233}$-containing solution.

2. The method of claim 1 in which the water-soluble compound having an ion containing manganese in a valence state not less than +6 and oxygen is potassium permanganate.

3. The process of claim 1 in which the reducing agent is hydroxylamine.

4. A cyclic method of separating protoactinium from contaminating elements normally associated with it in neutron-irradiated thorium, which comprises treating $Pa^{233}$ contained in an aqueous acidic solution of neutron-irradiated thorium, with a water-soluble manganous compound and water-soluble permanganate compound, separating the protoactinium carrier precipitate of manganese dioxide thus formed together with its associated $Pa^{233}$, from the solution and dissolved contaminating elements, and dissolving the carrier precipitate in an aqueous acidic solution containing hydroxylamine whereby the tetravalent manganese ions are converted to the divalent state, to complete the cycle.

5. The method of obtaining $U^{233}$ in a relatively pure state, which comprises carrying out a separation cycle on $Pa^{233}$ contained in an aqueous acidic solution of neutron-irradiated thorium, said cycle comprising treating said solution with a water-soluble manganese salt and a water-soluble compound having an anion containing manganese in a valence state not less than +6 and oxygen, separating the carrier precipitate of manganese dioxide thus formed together with its associated $Pa^{233}$ from the solution and the dissolved uranium, thorium, and radioactive fission products contained in the solution, dissolving the carrier precipitate, and repeating said cycle until the protoactinium carrier of manganese dioxide is substantially free of all thorium, uranium, and radioactive fission products, then aging the manganous ion solution until the $Pa^{233}$ has been substantially converted to $U^{233}$ by radioactive decay, then forming a manganese dioxide precipitate by treating the $Mn^{+2}$ ions present in the solution with an approximately stoichiometric amount of a water-soluble compound having an anion containing manganese in a valence state not less than +6 and oxygen, and separating the manganese dioxide precipitate thus formed from the $U^{233}$-containing solution.

6. The method of obtaining $U^{233}$ in a relatively pure state, which comprises carrying out a separation cycle on $Pa^{233}$ contained in an aqueous nitric acid solution of neutron-irradiated thorium, said cycle comprising treating said solution with a water-soluble manganous salt and a water-soluble compound having an anion containing manganese in a valence state not less than +6 and oxygen, separating the carrier precipitate of manganese dioxide thus formed together with its associated $Pa^{233}$ from the solution containing the dissolved uranium, thorium, and radioactive fission products, dissolving the carrier precipitate in an aqueous acidic solution containing a reducing agent having a potential more electropositive than −0.80 volt, repeating said cycle until the protoactinium carrier of manganese dioxide is substantially free of all thorium, uranium, and radioactive fission products, then aging the manganous ion solution until the protoactinium has been substantially converted to $U^{233}$ by radioactive decay, then forming a manganese dioxide precipitate by treating the $Mn^{+2}$ ions present in the solution with a greater than stoichiometric amount of a water-soluble compound having an anion containing manganese in a valence state not less than +6 and oxygen, and separating the manganese dioxide precipitate thus formed from the $U^{233}$-containing solution.

7. The method of claim 6 in which the water-soluble compound having an anion containing manganese in a valence state not less than +6 and oxygen is a permanganate salt and the reducing agent is hydroxylamine.

8. The method of claim 6 in which the water-soluble compound having an anion containing manganese in a valence state not less than +6 and oxygen is $KMnO_4$ and the reducing agent is hydroxylamine.

9. The method of obtaining $U^{233}$ in a relatively pure state, which comprises carrying out a separation cycle on $Pa^{233}$ contained in an aqueous solution between 1 and 5 N in nitric acid and containing neutron-irradiated thorium in a concentration between 0.02 and 0.65 M, said cycles comprising treating said solution with a water-soluble manganous salt and $KMnO_4$ in quantities sufficient to form a manganese dioxide precipitate in quantities between 0.70 and 5.5 grams of manganese dioxide per liter of solution, and separating said precipitate together with its associated $Pa^{233}$ from the solution and dissolved contaminants contained therein, dissolving the carrier precipitate in a solution between 1 and 5 N in nitric acid and containing hydroxylamine, and repeating said cycle until the protoactinium carrier of manganese dioxide is substantially free of all contaminants normally associated with protoactinium in neutron-irradiated thorium, then aging the manganous ion solution until the protoactinium has been substantially converted to $U^{233}$ by radioactive decay, forming a manganese dioxide precipitate by treating the $Mn^{+2}$ ions present with the stoichiometric amount of $KMnO_4$ and separating the manganese dioxide precipitate thus formed from the $U^{233}$-containing solution.

10. The method of obtaining $U^{233}$ in a relatively pure state, which comprises carrying out the separation cycle on $Pa^{233}$ contained in an aqueous solution of neutron-irradiated thorium, said cycle comprising treating said solution with a water-soluble manganous compound and a water-soluble permanganate compound, separating the protoactinium carrier precipitate of manganese dioxide thus formed together with its associated $Pa^{233}$ from the solution and dissolved contaminants, dissolving the carrier precipitate in an aqueous acidic solution containing hydroxylamine whereby the tetravalent manganese is reduced to the divalent state, treating said solution with permanganate ion whereby a manganese dioxide precipitate is formed, separating said precipitate together with its associated $Pa^{233}$ from the solution, aging the $Pa^{233}$ in said precipitate until it has been substantially converted to $U^{233}$ by radioactive decay, then dissolving said manganese dioxide carrier precipitate in an aqueous acidic solution containing hydroxylamine, forming a manganese dioxide precipitate by treating the $Mn^{+2}$ ions present in the solution with a greater than stoichiometric amount of a water-soluble permanganate and separating the manganese dioxide precipitate thus formed from the $U^{233}$-containing solution.

11. The method of concentrating and purifying $Pa^{233}$, which comprises carrying out a separation cycle on $Pa^{233}$ contained in an equeous acidic solution of neutron-irradiated thorium, said cycle comprising treating said solution with a water-soluble manganous salt and a water-soluble permanganate compound, separating the carrier precipitate of manganese dioxide thus formed together with its asosciated $Pa^{233}$ from the solution and the dissolved uranium, thorium, and radioactive fission products contained therein, dissolving the carrier precipitate in an aqueous acidic solution containing hydroxylamine, and repeating said cycle using a smaller amount of $KMnO_4$ each time, so that each manganese dioxide precipitate is less in mass than the proceding one, whereby the $Pa^{233}$ is purified and concentrated.

12. The method of dissolving a carrier precipitate of manganese dioxide containing protoactinium, which comprises treating said precipitate with an aqueous acidic solution containing hydroxylamine.

13. The method of dissolving a carrier precipitate of manganese dioxide containing $Pa^{233}$, which comprises treating said precipitate with an aqueous solution between 1 and 4 N in nitric acid and containing hydroxylamine.

14. The process of claim 12 wherein the protoactinium is the protoactinium isotope having a mass number of 233.

15. The method of separating protoactinium from uranium and thorium, which comprises treating an aqueous solution containing ionic values of protoactinium, thorium and uranium with a water-soluble manganous salt and a water-soluble compound having an anion-containing manganese in a valence state not less than 6 and oxygen, separating the carrier precipitate of manganese dioxide thus formed together with its asosciated protoactinium from the solution and the dissolved uranium and thorium values, dissolving the carrier precipitate and repeating said precipitation step until the protoactinium carrier of manganese dioxide is substantially free of all thorium and uranium values.

16. The method of separating protoactinium from uranium and thorium, which comprises treating an aqueous solution containing ionic values of protoactinium, thorium and uranium with a water-soluble manganous salt and a water-soluble compound having an anion containing manganese in a valence state not less than $+6$ and oxygen, separating the carrier precipitate of manganese dioxide thus formed together with its associated protoactinium from the solution containing the dissolved uranium and thorium, dissolving the carrier precipitate in an aqueous acidic solution containing a reducing agent having a potential more electropositive than $-0.80$ volt, repeating the precipitation step until the protoactinium carrier of manganese dioxide is substantially free of all thorium and uranium values.

17. The method of dissolving the carrier precipitate of manganese dioxide containing protoactinium, which comprises treating said precipitate with an aqueous solution between 1 and 4 N in nitric acid and containing hydroxylamine.

No references cited.